US008710982B2

(12) United States Patent
Monnerie et al.

(10) Patent No.: US 8,710,982 B2
(45) Date of Patent: Apr. 29, 2014

(54) METHODS AND SYSTEMS FOR SENDING MESSAGES REGARDING AN EMERGENCY THAT OCCURRED AT A FACILITY (75) Inventors: Emmanuel Monnerie, Cumming, GA (US); Jeffrey B. Shudark, Cumming, GA (US); Stephen J. Chasko, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 627 days.

(21) Appl. No.: 12/846,165

(22) Filed: Jul. 29, 2010

(65) Prior Publication Data
US 2012/0025979 A1 Feb. 2, 2012

(51) Int. Cl.
*G08B 1/08* (2006.01)
*G08B 25/00* (2006.01)
*G08B 21/04* (2006.01)

(52) U.S. Cl.
CPC .......... *G08B 25/009* (2013.01); *G08B 21/0484* (2013.01)
USPC .................. 340/539.22; 340/539.26; 340/632

(58) Field of Classification Search
CPC ........................ G08B 25/009; G08B 21/0484
USPC ................................................... 340/539.22
See application file for complete search history.

(56) References Cited

U.S. PATENT DOCUMENTS

| 4,090,248 | A | | 5/1978 | Swanson et al. |
| 4,686,630 | A | | 8/1987 | Marsland et al. |
| 5,155,468 | A | * | 10/1992 | Stanley et al. ................ 340/501 |
| 6,492,910 | B1 | | 12/2002 | Ragle et al. |
| 7,522,063 | B2 | * | 4/2009 | Ehlers ........................... 340/601 |
| 7,570,158 | B2 | | 8/2009 | Denny et al. |
| 7,669,212 | B2 | | 2/2010 | Alao et al. |
| 7,825,793 | B1 | | 11/2010 | Spillman et al. |
| 7,839,289 | B2 | * | 11/2010 | Chung et al. ............... 340/572.8 |

(Continued)

FOREIGN PATENT DOCUMENTS

| CN | 103477606 | 12/2013 |
| EP | 1571422 | 9/2005 |

(Continued)

OTHER PUBLICATIONS

"International Search Report and Written Opinion, 13 pages", PCT/US2011/056866, Dec. 16, 2011.

(Continued)

*Primary Examiner* — Kerri McNally
(74) *Attorney, Agent, or Firm* — Kilpatrick Townsend & Stockton LLP (57) ABSTRACT Systems and methods are disclosed for sending messages regarding an emergency at a facility. The messages can be sent to an emergency response service or directly to another facility through a wireless mesh network. The wireless mesh network can comprise one or more nodes that route measurement data, such as utility meter reading data. The emergency messages can be assigned a higher priority so that they travel through the wireless mesh network more quickly. A device receiving an emergency message may identify the address of the associated facility, for example, by identifying an address associated with utility service also provided at the same facility. The address can be forwarded to an emergency response service and a confirmation or other message may be sent back to the facility. A device at a facility may receive various messages from a control center, such as a weather center, over the wireless mesh network.

16 Claims, 8 Drawing Sheets (56) References Cited

U.S. PATENT DOCUMENTS

| | | | |
|---|---|---|---|
| 8,253,553 B2 | 8/2012 | Wedig et al. | |
| 2003/0134598 A1 | 7/2003 | Sendrowicz | |
| 2006/0055529 A1* | 3/2006 | Ratiu et al. | 340/539.1 |
| 2006/0125630 A1* | 6/2006 | Parkulo | 340/539.12 |
| 2007/0263641 A1* | 11/2007 | Yee | 370/401 |
| 2008/0309486 A1 | 12/2008 | McKenna et al. | |
| 2010/0060259 A1 | 3/2010 | Vaswani et al. | |
| 2011/0066297 A1* | 3/2011 | Saberi et al. | 700/287 |
| 2011/0122798 A1 | 5/2011 | Hughes et al. | |
| 2011/0161022 A1 | 6/2011 | Caird | |
| 2011/0163905 A1 | 7/2011 | Denis et al. | |
| 2011/0241877 A1 | 10/2011 | Wedig et al. | |
| 2012/0025979 A1 | 2/2012 | Monnerie | |
| 2012/0112901 A1 | 5/2012 | Chasko | |

FOREIGN PATENT DOCUMENTS

| | | |
|---|---|---|
| EP | 2388600 | 11/2011 |
| WO | 2007044445 | 4/2007 |
| WO | 2007135233 | 11/2007 |
| WO | 2012015784 | 2/2012 |
| WO | 2012064474 A1 | 5/2012 |
| WO | 2013006273 | 1/2013 |
| WO | 2013006273 | 3/2013 |

OTHER PUBLICATIONS

"International Search Report and Written Opinion, 15 pages", PCT/US2011/045286, Dec. 16, 2011.
PCT/US2011/056866, "International Preliminary Report on Patentability", May 23, 2013, 9 pages.
PCTUS2011/045286, "International Preliminary Report on Patentability," 11 pages, Feb. 7, 2013.
U.S. Appl. No. 12/942,449, "Office Action," 14 pages, Apr. 15, 2013.
U.S. Appl. No. 12/942,449, "Notice of Allowance", Sep. 13, 2013, 8 pages.
PCT/US2012/043311, "International search Report and Written Opinion", Jan. 22, 2013, 11 Pages.
PCT/US2012/043311, "International Preliminary Report on Patentability", Jan. 16, 2014, 8 pages.

* cited by examiner

METHODS AND SYSTEMS FOR SENDING MESSAGES REGARDING AN EMERGENCY THAT OCCURRED AT A FACILITY

TECHNICAL FIELD

The embodiments disclosed herein relate generally to networking, and relate specifically to devices and systems used to send messages regarding emergencies.

BACKGROUND

Persons in homes, places of work, and in other facilities use various technologies to report emergencies. For example, a homeowner can report a fire, break-in, medical issue, or other emergency by dialing 911 on a telephone to connect to an emergency operator. Home alarm systems also typically provide devices located in a facility that can send a message in response to a user-identified or sensor-identified emergency. These conventional emergency notification techniques have been most advantageous where the user or alarm device uses a traditional line-based telephone service provided to and associated with the facility. Because such phone service is typically provided for the particular facility, the recipient of the emergency notification is able to quickly and accurately identify the facility at which the emergency is occurring. Such localization, reliability, and convenience are critical components of an emergency response system that may slow down response time if non-existent or faulty.

Many facilities are no longer associated with traditional line-based telephone service. Many facility users are switching to instead rely upon Internet and cellular networks for voice communication services. Unfortunately, such Internet and cellular networks can be unreliable and provide limited or no capabilities for allowing localization. Wireless phone systems, for example, generally do not adequately permit a control center receiving emergency messages to reliably identify the location of the facility in which an emergency occurred. Dead zones or poor coverage areas also make it difficult for wireless phones to report emergencies. Both of these conditions contribute to slower response times. Messages sent over the Internet, including messages that use Voice over Internet Protocol (VoIP), use a public network with reliability issues and security vulnerabilities, making the Internet and VoIP communication poor options for sending emergency messages.

The use of other types of networks at homes and other facilities is also generally growing. For example, utility meters are commonly located at a facility such as a house or apartment unit to measure consumption of natural gas, water, and electricity. Emerging technologies related to utility usage and metering are providing utility communication networks, such as wireless mesh networks, that allow utility meters to send utility consumption data to a utility company's receiving device or devices. However, because of bandwidth, power, and other constraints, use of such networks has generally been limited to the specific purpose of allowing utility measurement and usage related communications.

SUMMARY

Systems and methods are disclosed for transmitting and responding to various types of messages using a mesh network, including messages indicating the occurrence of an emergency condition. An electronic system at a facility can receive input or an indication of the occurrence of an emergency condition in various ways. Generally, an indication of an occurrence of an emergency condition is a user-activated or automated indication that an emergency has occurred at a facility. In one embodiment, a system comprises one or more devices located at a facility. Such a device or devices receives an indication of an occurrence of an emergency condition at the facility and sends an emergency message through a network. The devices and network may be used for other purposes as well. For example, a wireless or wired mesh network can comprise one or more nodes that also receive and route measurement data collected by sensors at the facility and other facilities. Examples of such measurement data include consumption measurements for natural gas, water, and electricity. In one embodiment, a monitoring device at a facility receives emergency messages and measurement data and assigns a higher priority to the emergency messages.

A single transmission component at a facility can, in certain embodiments, be used to send both measurement data and an emergency message. Generally, one or more transmission components at the facility can be used to send measurement data and an emergency message to one or more nodes in the wireless mesh network and ultimately to one or more destinations. In certain embodiments, emergency messages are given a higher priority. The higher priority assigned to emergency messages can be recognized by the transmission components and/or the nodes of the wireless mesh network to allow such messages to traverse the wireless mesh network more quickly than lower priority messages.

An exemplary system can further comprise a control device that, in response to receiving an emergency message, identifies the emergency location and/or an appropriate emergency response service. Such a control device may also be capable of receiving a confirmation or other responsive message back from an emergency response service and sending messages to the facility, for example, to indicate that the emergency has been recognized and that help is on the way. A control device may additionally or alternatively cause the physical environment at the facility to be monitored, recorded, or changed.

In certain embodiments, a facility has one or more devices that receive user input indicating a request for assistance to be sent directly to one or more other facilities having devices accessible through a wireless mesh network. For example, if a criminal intrusion occurs at a facility, a user may send a message to one or more neighboring facilities to alert persons at those facilities that an emergency condition has occurred nearby. Such a message can be transmitted from one facility directly to another facility (i.e., without going first to a central location or control device) and may be sent in addition to an emergency message sent to a control device used to receive emergency messages and coordinate appropriate responses. Facility-to-facility messages can also be, as examples, requests for assistance from an occupant at a neighboring facility, alerts, or other types of notifications.

Embodiments can utilize a utility account associated with a facility to obtain location information and use this information to improve the processes of reporting and responding to emergencies occurring at the facility. Such localization of a facility that has experienced an emergency condition may be accomplished in various ways. In one example, a control device receives an emergency message and accesses a database that stores a utility meter identifier and corresponding address or other type of location information. The location information may be sent to an emergency response service such as a police station, fire station, or hospital to facilitate a response to the emergency. Response messages may also be sent to a facility experiencing an emergency condition to cause interior or exterior lights to turn on or off or to cause doors to lock or unlock. For example, a door may be unlocked to allow speed of entry of emergency response service persons.

One or more devices at a facility may also receive messages originating from, for example, control centers such as a weather center. In certain embodiments, a weather center may send a message to a device at a facility to alert an occupant that inclement weather is approaching the facility.

DETAILED DESCRIPTION

Figure 1:
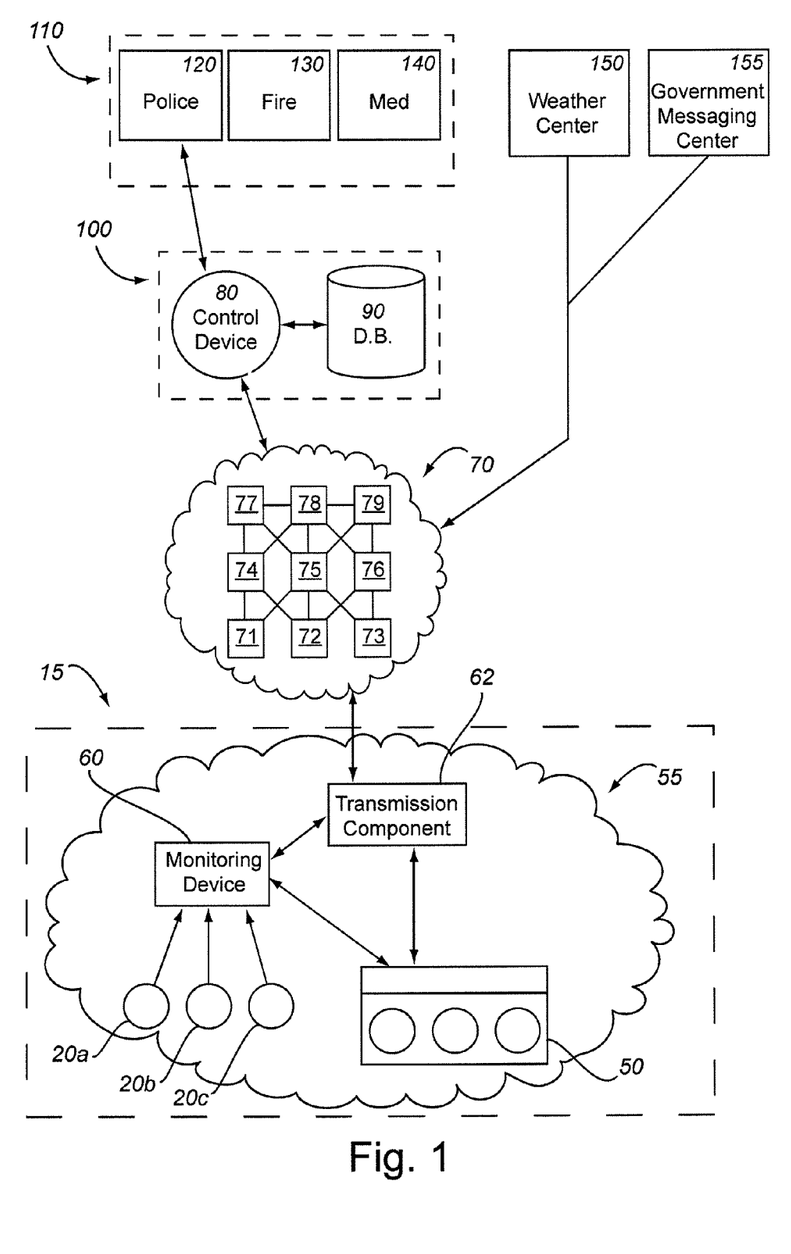
FIG. 1 is a schematic diagram of a system comprising various devices, components, and sensors at a facility, a wireless mesh network, a control device, and an emergency response service.

Embodiments will be described more fully with reference to the drawings. FIG. 1 shows a schematic diagram which is comprised of a device 50, sensors 20a-20c, a monitoring device 60, a transmission component 62, a wireless mesh network 70, a monitoring station 100, and emergency response services 110.

In various embodiments, facility 15 of FIG. 1 may be a house, apartment unit, or any place of dwelling, business, occupancy, or other location that is otherwise associated with a node of a wireless mesh network. The facility 15 can include areas within the dwelling confines of a location as well as surrounding areas in proximity to the dwelling confines. For example, devices and components described herein can be located inside or outside of the interior space of a house or apartment unit.

Figure 5:
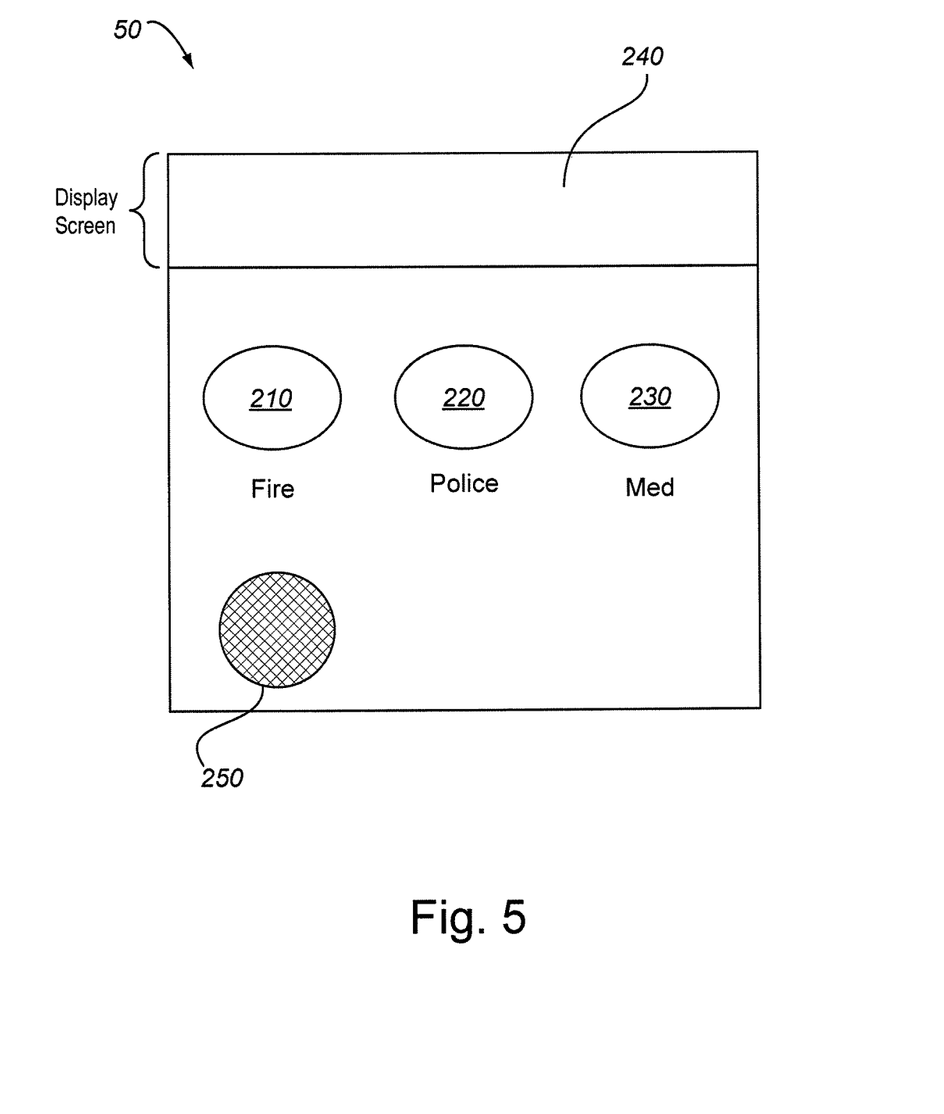
FIG. 5 is a schematic illustration of a device located at a facility.

Device 50 of FIG. 1 is located at facility 15 and in certain embodiments receives user input indicating an occurrence of an emergency condition. The device 50 may be a low-cost device equipped with one or more buttons 210, 220, 230 and a display screen 240, and may also comprise equipment 250 for audio communication (as shown in FIG. 5). Device 50 could provide other functions, for example, acting as a thermostat, alarm interface, or could be a part of another appliance, such as an air conditioning unit. A user may press the one or more buttons 210, 220, or 230 on device 50 to alert emergency response services such as fire stations, police stations, or hospitals that an emergency has occurred.

In this embodiment, upon receiving an indication of an occurrence of an emergency condition, the device 50 sends a message to the monitoring device 60 (as shown in FIG. 1) by way of the home area network 55 for routing to the wireless mesh network 70. Home area network 55 may in some embodiments use the ZIGBEE® protocol for routing messages. The monitoring device 60, in addition to receiving the message regarding the emergency condition from device 50, may also receive a message regarding an occurrence of an emergency condition from sensors 20a-20c at the facility 15. The sensors 20a-20c may monitor the physical environment at the facility 15 and automatically detect an indication of an occurrence of an emergency condition such as a fire or criminal intrusion and send an appropriate message to the monitoring device 60. FIG. 1 shows three sensors but fewer or more may be used. Multiple sensors 20a-20c may be placed at different locations within facility 15 to detect one type of emergency such as a fire, or multiple sensors may be used to detect various types of emergencies.

In addition to receiving messages regarding the occurrence of an emergency condition, the monitoring device 60 may also receive measurement data. In some embodiments, the measurement data may be comprised of measurements for the consumption of natural gas, water, or electricity at the facility 15. In one example, the measurements data is received in the monitoring device 60, which sends the measurements data to the transmission component 62. The transmission component 62 can send the measurement data to a node in the wireless mesh network 70. A utility meter may be used in some embodiments to receive the measurement data that is sent to the transmission component 62 or the monitoring device 60. In other embodiments, a utility meter or a single device may comprise both the monitoring device 60 and the transmission component 62.

The monitoring device 60 can further comprise logic that parses each incoming message to determine the type of message it receives. In one embodiment, the monitoring device 60 can make this determination by accessing one or more fields within the message structure shown in FIG. 3. For example, a device 50 can set the "Message Type" field of an emergency message to a value that represents an emergency, utility measurement data, or another type of notification, alert, or message. After determining the type of message, the monitoring device 60 can assign a higher priority to the emergency messages than that assigned to the measurement data to give the emergency messages priority routing through the wireless mesh network 70. For example, in some embodiments, the monitoring device 60 can assign a higher priority by setting an appropriate identifier in the "Mood/Priority" field shown in FIG. 3. Upon receiving a message, nodes in the wireless mesh network 70 can access this field to determine whether a message should receive priority routing. For example, a message with a "Mood/Priority" field set to "1" can indicate that the message is an emergency and should receive priority routing, as opposed to a message with a Mood/Priority field set to "2," which can indicate that the message is a lower-priority measurement data message.

Figure 3:
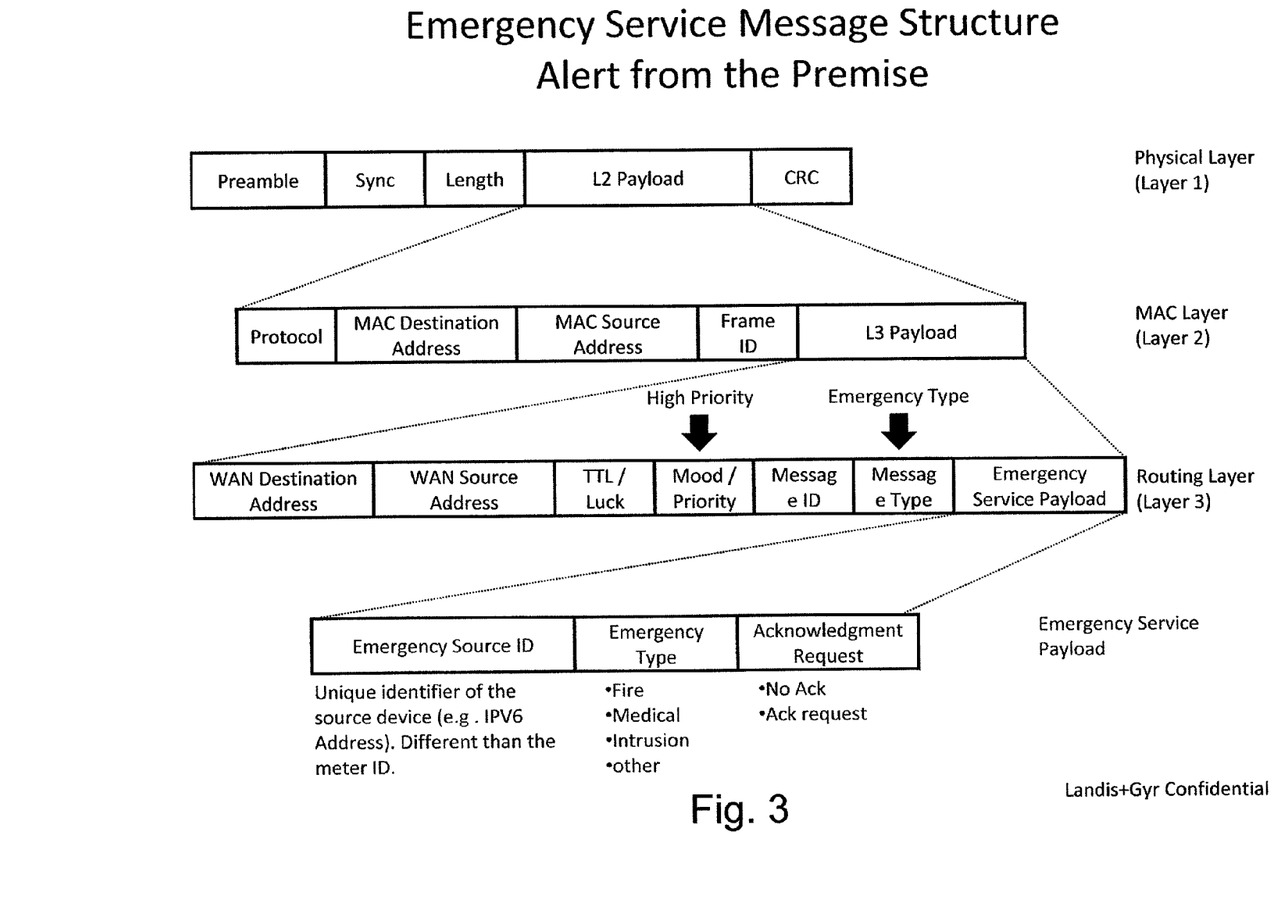
FIG. 3 is a schematic diagram showing the format of a message sent from one facility to another facility or to a node in a wireless mesh network.

Nodes in the wireless mesh network 70 may determine whether a message should receive priority routing by accessing various other fields in the message structure shown in FIG. 3. For example, in some embodiments, nodes in the wireless mesh network 70 can access the "Message ID" field, "Emergency Type" field, or otherwise any other field in the message structure of FIG. 3 that may contain information that distinguishes one type of message from another, to determine how to route a message. Various other message structures and fields can be accessed by the monitoring device 60 in other embodiments.

After receiving an indication of an occurrence of an emergency condition, the monitoring device 60 may cause the physical environment at the facility 15 to change by, for example, turning on lights, locking or unlocking doors, or activating a video recorder to record a criminal intrusion.

FIG. 1 shows nine nodes 71-79 comprising the wireless mesh network 70, but thousands of nodes can make up the wireless mesh network 70. A wired mesh network or combination wired/wireless network may be used to send messages in other embodiments. When a node in the wireless mesh network 70 receives an emergency message from the transmission component 62 in certain embodiments, the emergency message travels through one or more nodes in the wireless mesh network 70 to a control device 80 for a response.

In some embodiments, the control device 80 can comprise logic that parses an incoming message to determine whether the message indicates that an emergency has occurred and if so, to which emergency response service 110 to send the emergency message. Like the monitoring device and nodes in the wireless mesh network 70, the control device 80 can access various fields in a message structure to determine the type of message it received.

Figure 4:
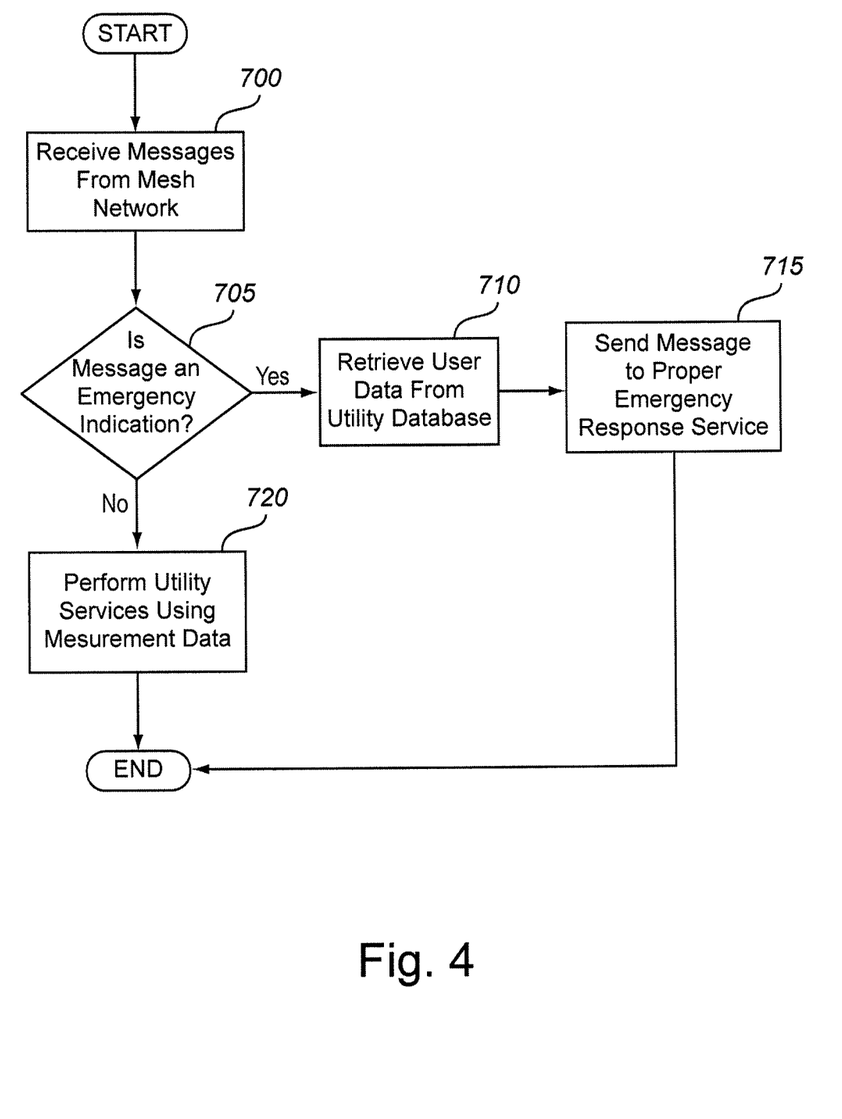
FIG. 4 is a flow diagram showing steps performed by a control device upon receiving an emergency message and measurement data.

If control device 80 receives an emergency message, it can look up the address of the facility in which the emergency occurred in database 90, and send the address to the appropriate emergency response service 110 so that the emergency response service 110 knows to which facility to respond. For example, as shown in FIG. 1, if a user at facility 15 presses button 220 of device 50 (as shown in FIG. 4), an emergency message alerting the police station 120 can be transmitted from the device 50 to the monitoring device 60. Upon receiving the emergency message, the monitoring device 60 can send the message to a node in the wireless mesh network 70 for routing to the control device 80. The control device 80 can then obtain the street address of the facility from database 90 and send the address along with the emergency message to the police station 120 for a response In certain embodiments, the control device 80 and database 90 are controlled by a utility company. The control device 80 may be a computer server with a logical connection to the database 90 residing on the same computer server. In other embodiments, the database 90 may reside in a separate location from the control device 80 and have a physical and logical connection to the control device 80. The database 90, according to some embodiments, can store information related to utility consumption by a utility company's customers. Such information can include a meter ID and an associated customer account number and street address. The database 90 can also contain a Wide Area Network (WAN) address, Media Access Control (MAC) address, or a latitude and longitude associated with each meter ID or monitoring component located at a facility. After the control device 80 receives an emergency message, it can use the meter ID to look up the street address of the meter at the facility in which an emergency occurred. In some embodiments, the control device 80 can use a WAN or MAC address associated with the meter ID, a monitoring device 60, or a transmission component 62 to look up a street address or a latitude and longitude in the database 90. This location information can be used by an emergency response service 110 to determine the location at which an emergency occurred. In addition to address information related to localization, the database 90 can also include other information that may aid an emergency response service 110 in responding to an emergency incident.

In some embodiments, the control device 80 can receive the street address of a facility from a user who enters such an address into a device 50. The control device 80 may verify that the street address entered by the user is the location at which an emergency occurred by checking such street address with that stored in database 90 for the associated meter ID or component from which the message originated. In other embodiments, a user at a location that is remote to the facility in which an emergency occurred can enter the street address of the emergency location. Upon receiving the street address of the emergency location and further determining that the message originated from a remote location, the emergency response service 110 can request an acknowledgement from either the user at the remote location or a user at the facility in which the emergency occurred.

Figure 7:
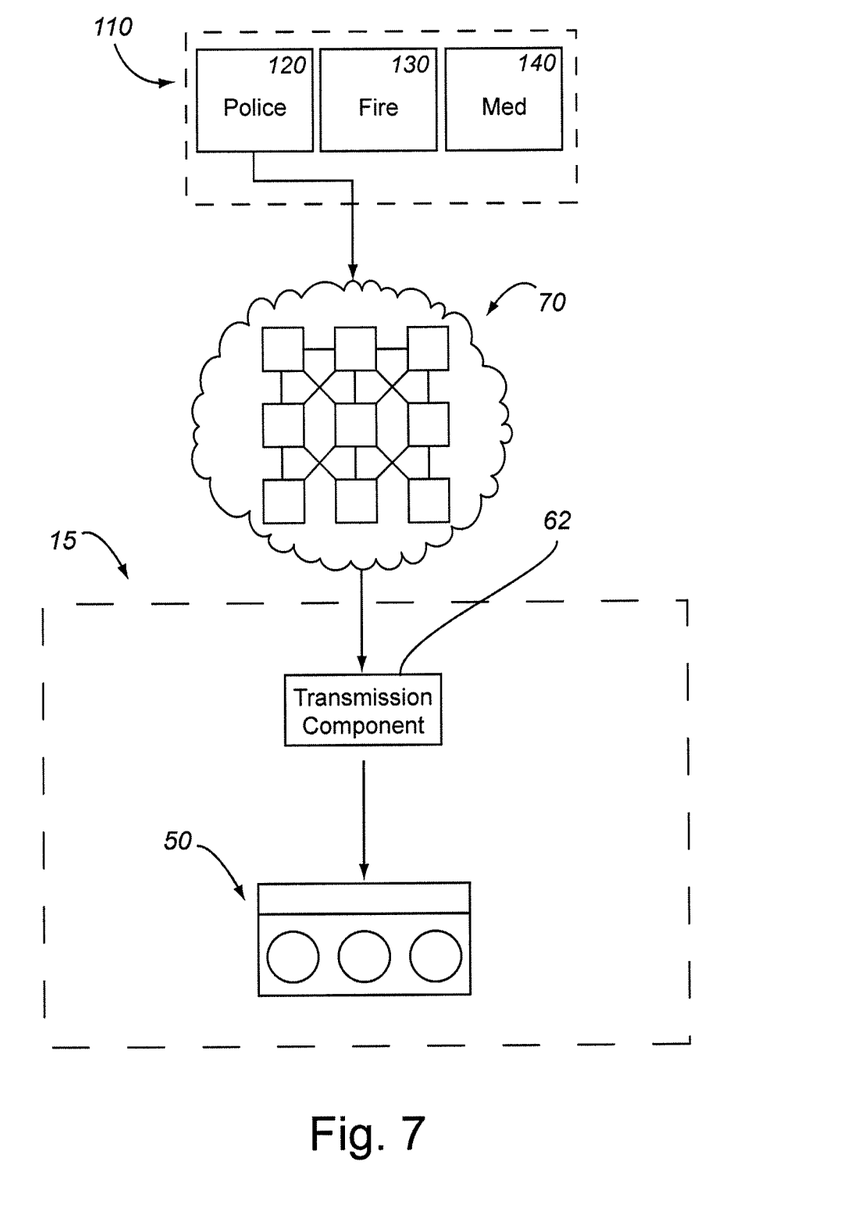
FIG. 7 is a schematic illustration of a response message sent from an emergency response service to a control device and subsequently over a wireless mesh network to a device at a facility.

As shown in FIG. 7, the emergency response services 110 may also send a confirmation or other message back to the device 50 to notify an occupant of a facility that the emergency message was received and help is on the way. The confirmation or other message may be routed back through wireless mesh network 70 to the transmission component 62, which may then send the confirmation to device 50. The device 50 may then display the confirmation as text on the display portion 240 or as an announcement through output 250, as shown in FIG. 5. In some embodiments, the device 50 may contain a keyboard or other means for entering text so that occupants may continue to send messages to the emergency response services 110.

According to some embodiments, one or more devices at a facility may receive messages from a control center such as a weather center 150 as shown in FIG. 1. For example, if weather center 150 detects a tornado, it can send an alert to a control device 80, which can send the alert to a node in the wireless mesh network 70 for routing to the device 50 or other devices located at facilities that may be in the path of the tornado.

Upon receiving a message from a control center 150, the control device 80 can in some embodiments access certain formatted fields of the message to determine which facilities should receive the message. For example, tornado warnings are often accompanied with the name of cities or counties that are projected to be in the path of the storm. The control device 80 can look up, for example, the WAN address of meters or components located at facilities within the cities or counties and send an alert to only the facilities within those areas. The control device 80 can also send a warning message to surrounding areas and distinguish the severity of the warning message by assigning a higher priority to messages destined for facilities in the path of the storm. In various other embodiments, the control device 80 can receive messages from other types of control centers and can similarly determine to which facility or facilities to send the message and what priority to assign the messages for routing through the wireless mesh network 70.

Figure 6:
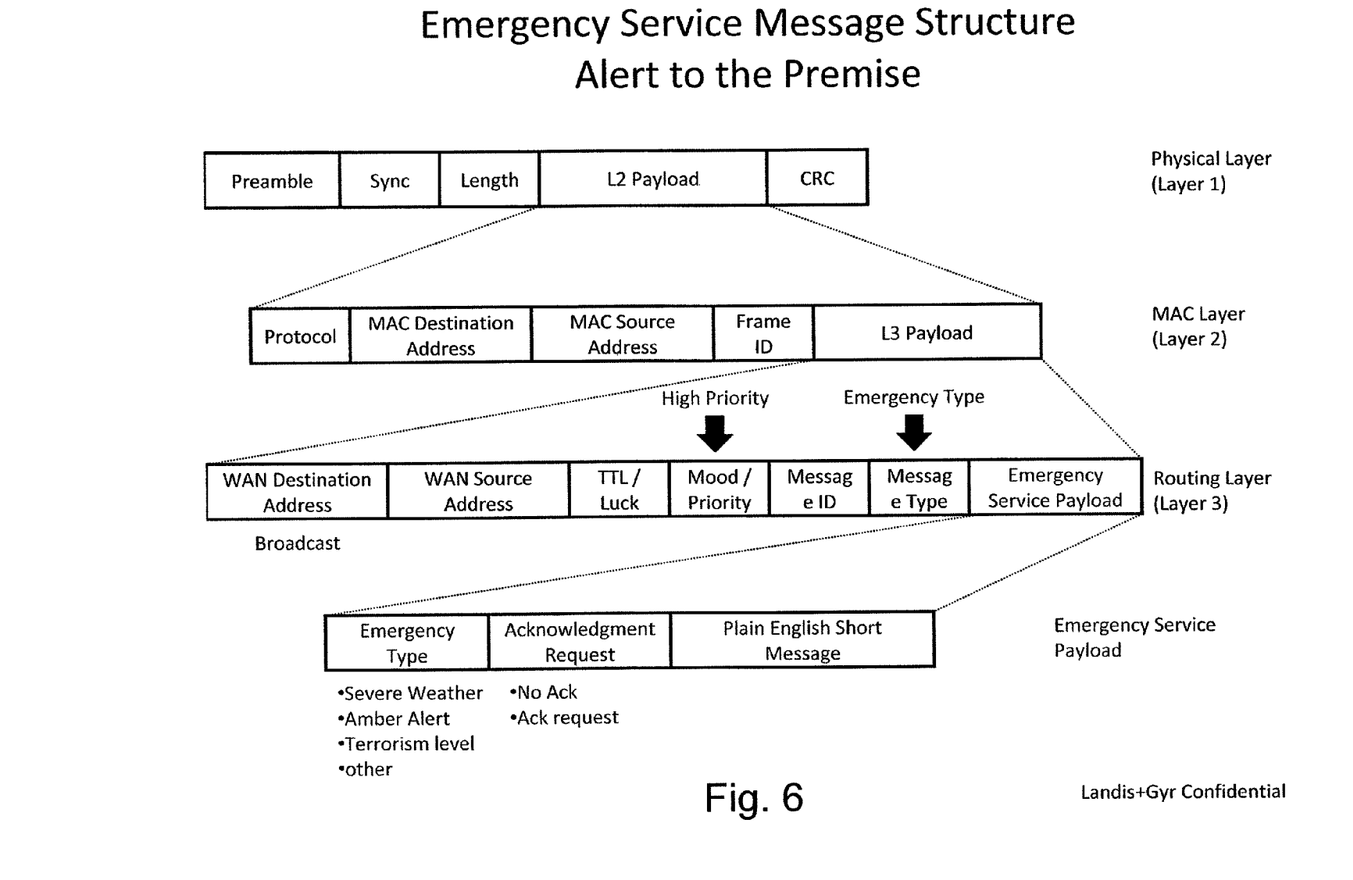
FIG. 6 is a schematic diagram showing the format of a message sent from a control device to a facility after the control device receives the message from an emergency response service.

A monitoring device 60 at a facility 15 can parse the message received from the control center 150 to access the type of emergency, the text of the message, and other information as indicated in FIG. 6. The text of the message can be displayed on display screen 240 or announced using component 250 of the device 50.

Figure 8:
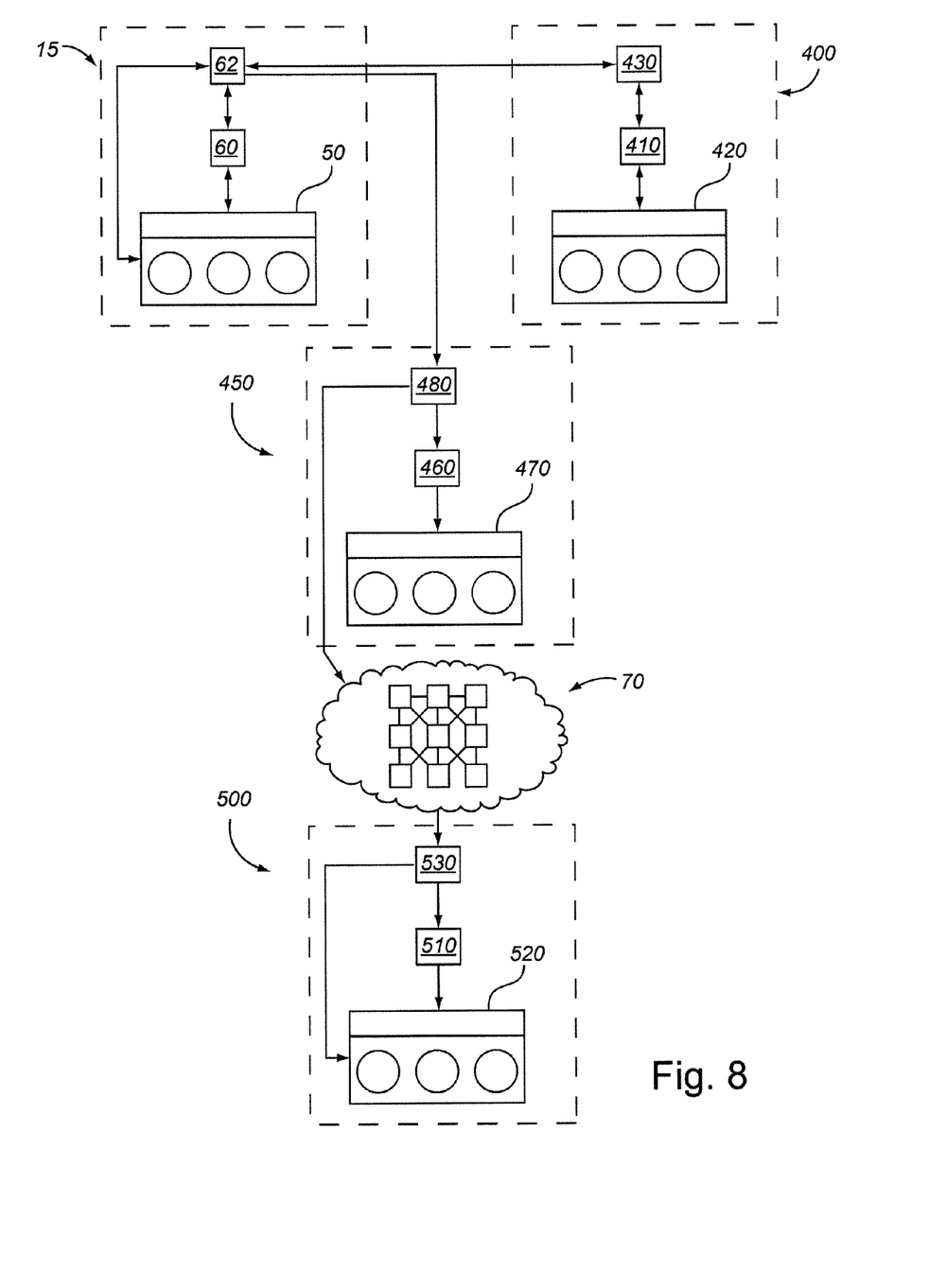
FIG. 8 is a schematic illustration of a facility-to-facility message being sent from a device at one facility directly to a device at one or more other facilities.

In addition to emergency messages from the facility 15, FIG. 8 shows an embodiment where a request for assistance travels through the same wireless mesh network 70 used to transfer measurement messages. Unlike emergency messages, the request for assistance does not rely on the control device 80. Rather it travels directly to one or more facilities by traveling through nodes 71-79 of the wireless mesh network 70. For example, as shown in FIG. 8, a user may initiate a request for assistance using device 50 at facility 15. The request for assistance may be received in monitoring device 60, which may send the request to the transmission component 62. Transmission component 62 at facility 15 may send the request for assistance to transmission component 430 at facility 400. The transmission component 420, upon receiving the request for assistance, may send the request for assistance to the device 420 at facility 400. The same request for assistance that was sent to facility 400 may be sent to facility 450 by using the transmission component 480 in the same fashion as that used at facility 400. Alternatively, the device 50 at facility 15 may send the request for assistance directly to the transmission component 62 instead of first sending it to monitoring device 60.

In another embodiment, the transmission component 62 at facility 15 may also send the request for assistance through wireless mesh network 70 to device 520 at facility 500. The request for assistance arrives at the device 520 in the same fashion as it does at facility 400 and facility 450 described above, except that it travels over mesh network 70 to reach facility 500. Upon receiving the request for assistance, the devices 420, 470, and 520 may display the request for assistance on a display screen 240 or announce the request for assistance using component 250, as shown in FIG. 5.

Devices that receive a request for assistance may also receive user input to send a response or other message back to the requesting device to be displayed or announced. Each request for assistance and response may be accompanied by a source identifier to notify recipients who sent the particular request for assistance or response. Thus, if the device 50 sends notification of a criminal intrusion at the facility 15, users at the facilities 400, 450, and 500 may be notified and possibly provide assistance. This response may be in addition to emergency messages sent to the emergency response services 110 and may increase the likelihood of receiving timely assistance. In other embodiments, a notification, alert, or other type of message may be sent in addition to a request for assistance.

Figure 2:
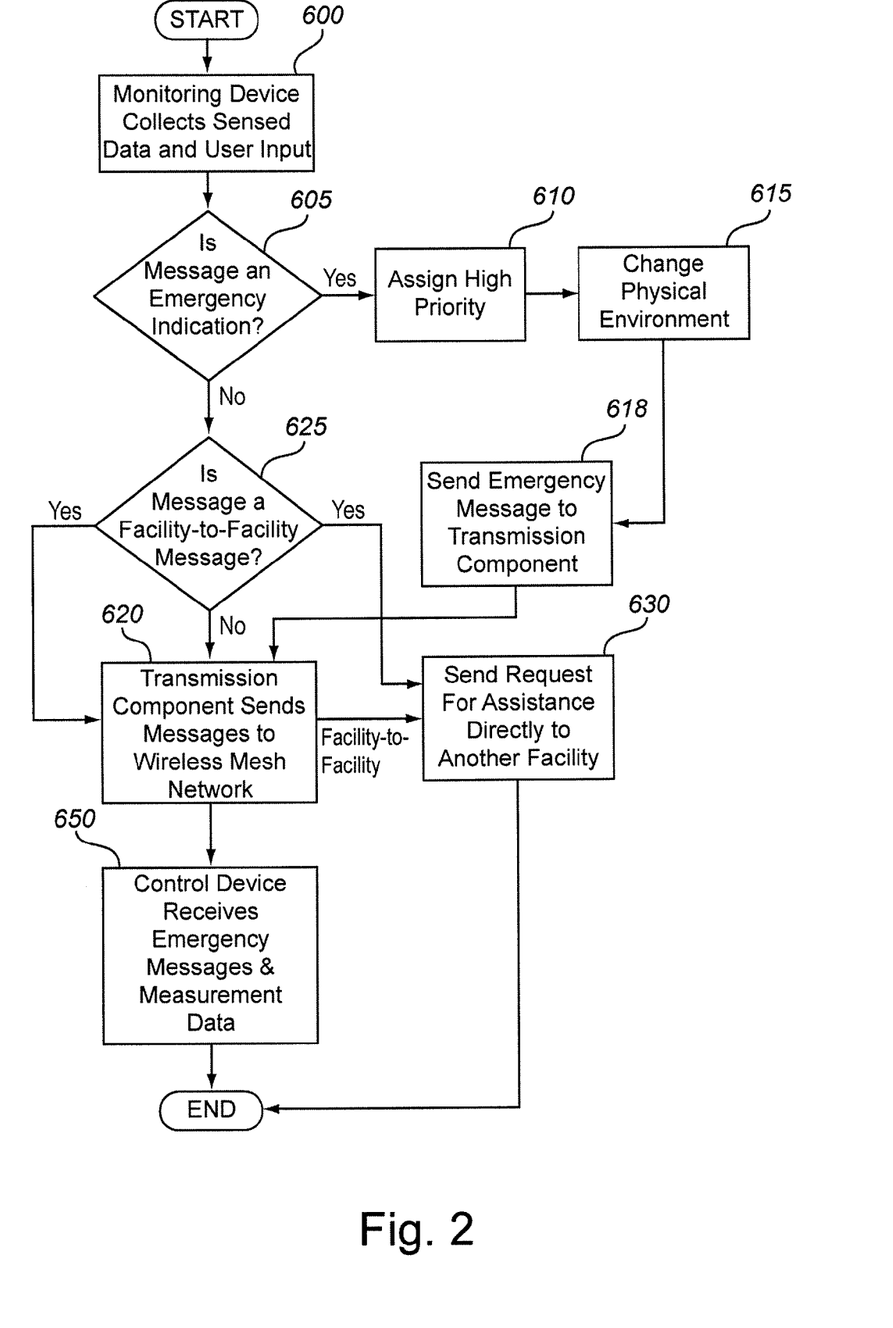
FIG. 2 is a flow diagram showing steps performed by a monitoring device upon receiving various types of messages.

FIG. 2 is a flow diagram of one embodiment beginning with messages entering a monitoring device 60. At step 600, the monitoring device 60 receives the messages described in various embodiments herein. If the monitoring device 60 determines that the message is an indication of an occurrence of an emergency condition (step 605), the monitoring device 60 will assign a high priority to the emergency message (step 610) and may change the physical environment at the facility (step 615) by, for example, turning on lights or locking doors at the facility. The monitoring device 60 may then transmit the emergency message to a transmission component 62, which may send the emergency message to the wireless mesh network 70 along with other messages (described in certain embodiments as measurement data and requests for assistance) (see step 620). If the monitoring device 60 determines that the message is a request for assistance or other facility-to-facility message at step 625, it can send the facility-to-facility message directly to a device at another facility (step 630).

A device receiving a facility-to-facility message can also communicate with a node in the wireless mesh network to send a message to a device at another facility (step 620). For example, in FIG. 8, the device 50 at facility 15 can send a message to the device 470 at facility 450. The device 470, upon receiving the message, may display or announce the message, and may also send the message to device 520 at facility 500 by way of wireless mesh network 70. Measurement data is routed from the wireless mesh network 70 to the control device 80 (step 650).

FIG. 4 is a flow diagram beginning with messages entering a control device 80. The control device 80 in some embodiments receives emergency messages and measurement data from a node in the wireless mesh network 70 (step 700). If the control device 80 determines at step 705 that the message is an emergency message, it will retrieve the address of the facility in which an emergency occurred, along with other possible information, by searching in a database 90 maintained by a utility company (step 710). The control device 80 may send the emergency message along with the address of the facility in which the emergency occurred to the appropriate emergency response service 110 (step 715). Utility services can be performed on any measurement data at step 720.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A system comprising:
a monitoring device receiving a message, from a device at a facility, parsing the message to determine whether the message includes an indicator for an occurrence of an emergency condition at the facility, and assigning a high priority to the message responsive to a determination that the message includes the indicator for the emergency condition, wherein receiving the message comprises receiving user input at the monitoring device indicating that a fire, a medical emergency, or criminal activity has occurred or is occurring; and
a transmission component, at the facility, sending a high priority message to a node of a mesh network, the high priority message including the indicator for the occurrence of the emergency condition; and
wherein the mesh network comprises one or more nodes that receive and route measurement messages from facilities, wherein the measurement messages comprise information about measurements from sensors at the facilities.

2. The system of claim 1 further comprising:
a sensor measuring consumption of natural gas, water, or electricity at the facility;
wherein the transmission component further sends messages with information about measurements from the sensor, wherein the messages are routed through the one or more nodes of the mesh network.

3. The system of claim 2 wherein the message including the indicator for the occurrence of the emergency condition has a higher routing priority within the mesh network than the messages with information about measurements from the sensors.

4. The system of claim 2 the system further comprising the monitoring device receiving the messages with information about measurements from the sensors and receiving the message including the indicator for the occurrence of the emergency condition, wherein the monitoring device provides the message including the indicator for the occurrence of the emergency condition to a control device for responding.

5. The system of claim 1 the system further comprising a control device processing the message including the indicator for the occurrence of the emergency, wherein, in response, the control device sends a response message to the device.

6. The system of claim 5 wherein, in response to receiving the response message from the control device, the monitoring device:
displays or announces a notification including the indicator that the emergency service has been alerted; or
causes the physical environment at the facility to be monitored, recorded, or changed.

7. The system of claim 1 wherein the message is received based upon automated recognition that fire, a medical emergency, or criminal activity has occurred or is occurring at the facility.

8. The system of claim 1 wherein the monitoring device further receives user input indicating a request for assistance to be sent to one or more of the facilities, wherein the transmission component sends the request for assistance directly to one or more facilities for a response.

9. A system comprising:
a monitoring device receiving a message, from a device at a facility, parsing the message to determine whether the message includes an indicator for an occurrence of an emergency condition at the facility, and assigning a high priority to the message responsive to a determination that the message includes the indicator for the emergency condition; and
a sensor measuring consumption of natural gas, water, or electricity at the facility;
a control device that, in response to the message indicating the occurrence of the emergency condition, determines the location of the facility based on address information for an account associated with provision of the natural gas, water, or electricity at the facility; and
a transmission component, at the facility, sending a high priority message to a node of a mesh network, the high priority message including the indicator for the occurrence of the emergency condition, wherein the transmission component further sends messages with information about measurements from the sensor, wherein the messages are routed through the one or more nodes of the mesh network; and
wherein the mesh network comprises one or more nodes that receive and route measurement messages from facilities, wherein the measurement messages comprise information about measurements from sensors at the facilities.

10. A system comprising:
a monitoring device receiving a message, from a device at a facility, parsing the message to determine whether the message includes an indicator for an occurrence of an emergency condition at the facility, and assigning a high priority to the message responsive to a determination that the message includes the indicator for the emergency condition;
a control device processing the message including the indicator for the occurrence of the emergency, wherein, in response, the control device determines an address of the facility having the emergency condition, alerts an emergency response service, and provides the address of the facility to the emergency response service and
a transmission component, at the facility, sending a high priority message to a node of a mesh network, the high priority message including the indicator for the occurrence of the emergency condition; and
wherein the mesh network comprises one or more nodes that receive and route measurement messages from facilities, wherein the measurement messages comprise information about measurements from sensors at the facilities.

11. A system comprising:
a monitoring device receiving a message, from a device at a facility, parsing the message to determine whether the message includes an indicator for an occurrence of an emergency condition at the facility, and assigning a high priority to the message responsive to a determination that the message includes the indicator for the emergency condition, wherein the monitoring device is a thermostat comprising a plurality of buttons, one of the buttons, when selected, providing an indication of the occurrence of the emergency condition at the facility; and
a transmission component, at the facility, sending a high priority message to a node of a mesh network, the high priority message including the indicator for the occurrence of the emergency condition; and
wherein the mesh network comprises one or more nodes that receive and route measurement messages from facilities, wherein the measurement messages comprise information about measurements from sensors at the facilities.

12. A method comprising:
receiving an emergency message regarding an occurrence of an emergency condition at a facility, the emergency message received after being sent from the facility with a high priority through a mesh network and identified by parsing the emergency message to determine whether an emergency indicator is included in the emergency message;
receiving a measurement message at a lower priority than the emergency message, wherein the measurement message comprises information about a measurement from a utility consumption sensor at the facility, wherein the measurement message is received after being sent from the facility through the mesh network; and
in response to receiving the emergency message, alerting an emergency response service.

13. The method of claim 12 wherein the measurement message is consumption of natural gas, water, or electricity at the facility.

14. The method of claim 12 further comprising determining the location of the facility based on address information for an account associated with provision of natural gas, water, or electricity at the facility.

15. The method of claim 12 further comprising prioritizing the emergency message above the measurement message.

16. A system comprising:
a device, at a facility, receiving an indication of an occurrence of an emergency condition at the facility;
a sensor, at the facility, measuring consumption of natural gas, water, or electricity at the facility;
a transmission component, at the facility, sending a message through a network with a high priority, the message including an indicator for the occurrence of the emergency condition, wherein the transmission component also sends messages with information about measurements from the sensor through the network at a lower priority than the message including the indicator, and wherein the transmission component is configured to determine whether to send the message at a high priority based at least in part parsing the message to identify the indicator; and a control device that, in response to receiving the message including the indicator for the occurrence of the emergency condition, determines the location of the facility based on address information for an account associated with provision of the natural gas, water, or electricity at the facility.

\* \* \* \* \*